(12) United States Patent
Nimbavikar et al.

(10) Patent No.: US 11,382,031 B2
(45) Date of Patent: *Jul. 5, 2022

(54) SYSTEMS AND METHODS FOR ENHANCED FREQUENCY ALLOCATION

(71) Applicant: T-Mobile USA, Inc., Bellevue, WA (US)

(72) Inventors: Gunjan Nimbavikar, Bellevue, WA (US); David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,511

(22) Filed: Mar. 12, 2020

(65) Prior Publication Data
US 2020/0213939 A1    Jul. 2, 2020

Related U.S. Application Data

(63) Continuation of application No. 16/014,141, filed on Jun. 21, 2018.

(51) Int. Cl.
*H04W 48/18* (2009.01)
*H04W 28/16* (2009.01)
(Continued)

(52) U.S. Cl.
CPC ........... *H04W 48/18* (2013.01); *H04W 28/16* (2013.01); *H04W 88/06* (2013.01); *H04W 88/10* (2013.01)

(58) Field of Classification Search
CPC ..... H04W 48/18; H04W 60/00; H04W 76/27; H04W 48/16; H04W 60/04; H04W 36/14; H04W 88/06; H04W 76/10
See application file for complete search history.

(56) References Cited

U.S. PATENT DOCUMENTS 10,085,199 B1 * 9/2018 Shaw ..................... H04W 24/04
10,652,811 B2 * 5/2020 Nimbavikar .......... H04W 28/16
(Continued)

OTHER PUBLICATIONS

333GPP TR 37.834 V2.0.0 (Nov. 2013), 3rd Generation Partnership Project; Technical Specification Group Radio Access Network; Study on WLAN/3GPP radio interworking (Release 12), pp. 1-18.*
(Continued)

*Primary Examiner* — Khalid W Shaheed
(74) *Attorney, Agent, or Firm* — Lee & Hayes, P.C.

(57) ABSTRACT

Systems and methods for improving network resource allocation are disclosed. The system can determine which user's equipment (UEs) can be reallocated from a first network (e.g., one of the 4G network or the 5G network) to a second network (e.g., the other of the 4G network or the 5G network) to reduce load on the first network. The system can determine which UEs are capable of using each type of network and which services or applications that are suitable for use on each type of network. Due to differences in propagation and penetration distances of various frequency spectrums, the system can also determine which UEs have sufficient signal strength for each type of network. The system can reside on the network, on the UEs, or on both the network and the UE. The system can switch back and forth between multiple networks as conditions, applications, or other factors change.

20 Claims, 6 Drawing Sheets

(51) Int. Cl.
*H04W 72/00* (2009.01)
*H04W 88/10* (2009.01)
*H04W 88/06* (2009.01)

(56) References Cited

U.S. PATENT DOCUMENTS

| | | | |
|---|---|---|---|
| 2008/0081623 A1 | 4/2008 | Burgan et al. | |
| 2009/0097450 A1* | 4/2009 | Wallis | H04W 36/0022 370/331 |
| 2009/0207808 A1* | 8/2009 | McCann | H04W 12/062 370/331 |
| 2011/0111765 A1* | 5/2011 | Yang | H04W 72/0486 455/452.1 |
| 2014/0133294 A1* | 5/2014 | Horn | H04W 28/0247 370/230 |
| 2014/0355463 A1* | 12/2014 | Smith | H04M 15/60 370/252 |
| 2015/0087307 A1* | 3/2015 | Cui | H04W 48/20 455/436 |
| 2015/0133081 A1* | 5/2015 | Griot | H04L 12/1407 455/407 |
| 2015/0195730 A1 | 7/2015 | Siomina et al. | |
| 2015/0230070 A1* | 8/2015 | Kadiyala | H04W 4/16 455/417 |
| 2015/0312874 A1* | 10/2015 | Das | H04L 67/148 455/435.1 |
| 2016/0044129 A1 | 2/2016 | Bergmann et al. | |
| 2016/0337239 A1* | 11/2016 | Nasielski | H04L 47/11 |
| 2018/0077621 A1* | 3/2018 | Harrang | H04W 28/10 |
| 2018/0279400 A1* | 9/2018 | Faccin | H04W 68/005 |
| 2019/0174449 A1* | 6/2019 | Shan | H04W 76/11 |
| 2019/0268950 A1* | 8/2019 | Youtz | H04W 76/30 |
| 2019/0320494 A1* | 10/2019 | Jayawardene | H04L 5/0041 |
| 2019/0394718 A1 | 12/2019 | Nimbavikar et al. | |

OTHER PUBLICATIONS

Office Action for U.S. Appl. No. 16/014,141, dated Aug. 29, 2018, Gunjan Nimbavikar, "Systems and Methods for Enhanced Frequency Allocation", 24 pages.

Office Action for U.S. Appl. No. 16/014,141, dated Feb. 15, 2019, Gunjan Nimbavikar, "Systems and Methods for Enhanced Frequency Allocation", 24 pages.

Office Action for U.S. Appl. No. 16/014,141, dated Apr. 30, 2019, Gunjan Nimbavikar, "Systems and Methods for Enhanced Frequency Allocation", 26 pages.

Office Action for U.S. Appl. No. 16/014,141, dated Sep. 17, 2019, Gunjan Nimbavikar, "Systems and Methods for Enhanced Frequency Allocation", 14 pages.

* cited by examiner

SYSTEMS AND METHODS FOR ENHANCED FREQUENCY ALLOCATION

CROSS-REFERENCE TO RELATED APPLICATION

This application is a continuation of, and claims priority to, U.S. application Ser. No. 16/014,141, filed on Jun. 21, 2018, which is fully incorporated by reference herein.

BACKGROUND

The proliferation of wireless devices that use cellular and/or Wi-Fi frequencies for data transfer has placed increased demand on these systems. Users check e-mail, surf the Internet, download movies, and perform other tasks on cell phones, tablet computers, laptops, and other devices (collectively, user equipment, or "UEs"). To provide faster ("gigaspeed") connections, however, additional bandwidth in the frequency spectrum—i.e., other than the traditional 2G, 3G, 4G LTE, and Wi-Fi frequencies—is needed.

To this end, new portions of the frequency spectrum—the millimeter wave spectrum—have been made available for use with the coming fifth-generation, or 5G, network. This technology promises 1+gigabit download speeds and is sometimes referred to as a "wireless fiber" network. 5G network frequency allocation has already begun, with frequencies from approximately 600 MHz-100 GHz. The 5G network and associated technologies are rolling out in some areas now and other areas in the near future.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
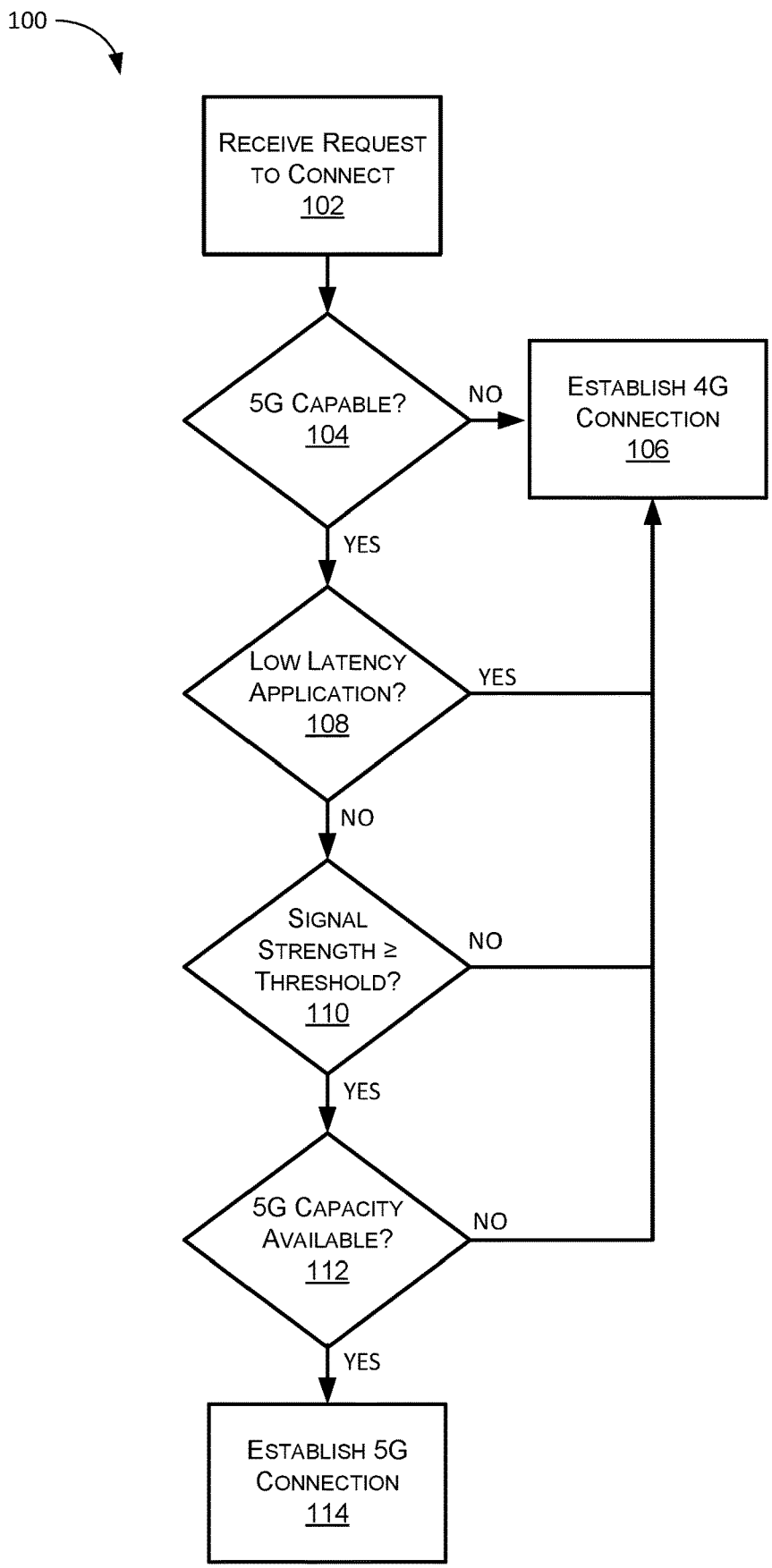
FIG. 1 is a flowchart depicting an example of a method for managing network traffic from a network perspective, in accordance with some examples of the present disclosure.

As mentioned above, additional frequency spectrum is needed to meet current and future wireless voice and data demands. In addition, new technology is needed to provide the desired network speed and efficiency. New fifth-generation (5G) technologies promise to provide significantly increased throughput (1+ Gbps), but are not without their difficulties.

One issue to be considered during 5G implementation is the relatively short propagation and penetration distances provided by the millimeter wave ("mm-wave") frequencies—approximately 30-100 GHz—used for some of the 5G spectrum. These relatively high-frequency waves do not travel as far, and are more easily blocked, when compared to the lower frequencies used in conventional networks. Fortunately, these frequencies also use smaller antennas, enabling providers to use multiple mini- or microcells, among other things, to deal with propagation and penetration issues.

To this end, it would be useful to have a system that efficiently allocates wireless usage by offloading appropriate traffic from conventional 2G, 3G, and 4G LTE networks to the 5G network. The system can manage users' equipment (UEs) by type, location, signal quality, and type of use to ensure that each UE receives sufficient quality of service (QoS), while network resources are better allocated. It is to such a system that examples of the present disclosure are directed.

Examples of the present disclosure comprise systems and methods for allocating resources between conventional networks (e.g., 2G, 3G, 4G LTE, and Wi-Fi networks) and new 5G networks. The system can account for UE capabilities, location, application, and other factors to offload traffic from the conventional networks to 5G networks, while still maintaining QoS. The system can enable the conventional networks to be supplemented by the 5G network, rather than being phased out.

For ease of explanation, the systems and methods are described herein as moving traffic off of the 4G LTE (sometimes also called just 4G or LTE) network and onto the 5G network. One of skill in the art will recognize, however, that the system is not so limited. The system can also remove load from other existing systems including, but not limited to, 2G, 3G, and Wi-Fi networks. The system is also described below for use with cellular communications and UE. The system is equally applicable to other networks and systems, however, which can take advantage of differences in network or system factors to reduce congestion and increase performance.

As used herein, the term "throughput" is used to refer to the speed with which data can be transmitted over the various networks in, for example, megabits per second (Mbps) or gigabits per second (Gbps). The term "bandwidth," which is often conflated with throughput, is used herein to refer to various bands of frequencies for use by the system. For simplicity, the system is described generally below for use with cellular UE such as, for example, cell phones, smart phones, tablet computers, etc. One of skill in the art will recognize, however, that the system can be used with any suitable network-connected device including, for example, machine-to-machine (M2M), internet of things (IoT), or even future technologies that have not yet been developed.

In some examples below, the system is described as using session initiation protocol (SIP) messaging to perform various functions. Again, this is simply to simplify and clarify the examples. One of skill in the art will recognize that the system is equally compatible with other current, and future, communications protocols.

As shown in FIG. 1, examples of the present disclosure can comprise a method 100 for allocating traffic between the 4G network and the 5G network, which can be partially or fully implemented from the network. Thus, the method 100 can be administered at the wireless base station (WBS) level, for example, or by a network entity such as a home subscriber server (HSS), which is discussed in more detail below with reference to FIG. 3. As discussed below with reference to FIG. 2, in some examples, some or all of the allocation can be handled from the UE.

Moving certain traffic off of the 4G network reduces congestion in at least two ways. The first is simply that the throughput required to download a file, for example, has literally been moved from one part of the network to the other. But, the second advantage is that, for certain types of files (e.g., large downloads), the 5G network is several orders of magnitude faster than the 4G network. So, the traffic simply requires less overall network time to download on the 5G network. In addition, reducing traffic on the 4G network reduces other overhead such as, for example, the interference caused by signaling and traffic on busy networks.

The system is described below as a system for allocating traffic between the two networks, which could be used simply to better manage network resources or as a "fallback"—the system can use the 5G network as "overflow" when the 4G network is at capacity. The system can also be used to meet various QoS criteria such as, for example, providing a minimum bit rate connection to commercial customers. Because capacity on the 5G network may be somewhat limited initially, as the new technology is rolled out it may be desirable to manage traffic on the network from the network side. In other words, users would likely choose to use the 5G network for everything due to its higher speeds, but this may result in network congestion. Thus, the method 100 can be used to manage resources on both the 4G and 5G network to provide an optimized solution.

For simplicity, the method 100 is discussed below as being performed at the WBS level. It should be noted, however, that the method 100 could also be implemented by another network entity such as, for example, the HSS or a third-generation partnership program authentication, authorization, and accounting (3GPP AAA) server. At 102, the WBS can receive a registration request from a UE. In some examples, this can be a simple session initiation protocol (SIP) registration request. In some examples, because there is more than one possible network, the UE can also include a service request at registration. In other words, the registration request, or a separate SIP message, can include what service the UE wishes to use. This may include a request to place a voice call, the address of a particular telephony application server (TAS) associated with the requested service, or a web address from a web browser, among other things.

To determine which traffic is suitable for reallocation (or, being moved from the 4G network to the 5G network), some technical factors can be taken into account. At 104, therefore, the WBS can determine if the UE is 5G capable. Obviously, the UE making the registration request must be 5G capable—i.e., the UE must include the necessary transceivers, chipsets, and related equipment—to even be considered for reallocation. Legacy UEs—i.e., UEs that are not 5G capable—can remain in use on the 4G, and other, networks. Indeed, while legacy UEs are not eligible for reallocation, they also benefit from the method 100 because congestion on the 4G network is reduced, which can increase speeds, reduce latency, etc.

In some cases, the UE may be 5G capable from a technical standpoint (i.e., includes the necessary hardware), but cannot currently connect to the 5G network. This may be due to a hardware or software failure, low battery levels, low buffer levels, etc. Thus, in some examples, the SIP registration request may also include information indicating the UE is at least temporarily unable to use the 5G network. In some examples, the registration request can include a model number or serial number for the UE. The WBS can then use a lookup table, for example, to determine which UEs are 5G capable. In some examples, unless the UE indicates otherwise, the WBS can assume that UEs that are 5G capable in general are currently 5G capable (i.e., do not have low batteries or other issues).

Regardless of the reason, if the UE is determined to be unable to connect to the 5G network, then at 106, the WBS can establish a 4G connection for the UE. In this manner, the 4G network can work in concert with the 5G network to form a "carrier combination" to ensure that legacy UE are still provided with connectivity. Indeed, as discussed below, in some examples, even 5G capable UE may be connected to the 4G network for QoS and/or technical reasons.

If the UE is determined to be 5G capable, on the other hand, then at 108, the WBS can determine if the service requested in the registration request is one that is better suited for low latency connectivity. In other words, even though 5G networks have inherently lower latency and delay, in configurations where the 4G network remains the standard network—and the 5G network acts only as a support network—some time is required to "switch" from the 4G network to the 5G network. As a result, some applications that rely on, for example, various performance parameters (e.g., low error rates, low latency) may be chosen to remain on the 4G network, while other applications that have different requirements (e.g., high throughput) may be offloaded to the 5G network. So, for example, a voice call—which needs to be connected relatively quickly—may remain on the 4G network; while an operating system (OS) download—which merely needs to be downloaded sometime in the next two hours—can be reallocated to the 5G network.

If the application is one that is better suited to a connection on the 4G network, then at 106, the WBS can establish a 4G connection for the UE. If the application is one that is somewhat more flexible in this regard, then at 110, the WBS can determine if the UE has sufficient signal strength to use a 5G connection. Applications that are somewhat less time-sensitive such as, for example, large file downloads, updates, and some streaming services (i.e., it may not matter to the user whether the music starts in two seconds or five seconds) can be reallocated to the 5G network.

Due to the somewhat limited propagation and penetration distances associated with mm-wave frequencies—which form a portion of the 5G spectrum—the UE's distance from the WBS, obstacles between the UE and the WBS, speed the UE is traveling toward or away from the WBS, and other factors can also be considered. These factors can be indirectly measured using signal strength to/from the UE, which naturally takes these factors into account. This can be measured at the WBS at the UE, or at both the WBS and the UE using various, known techniques.

If the UE does not have sufficient signal strength to use the 5G network, then at 106, the UE can remain on the 4G network. This may be because the UE is too far from the WBS or is blocked by buildings or other obstacles. This may also be because the UE is transmitting at a reduced power level to conserve battery life. This may also be due to environmental conditions (e.g., rain or fog between the UE and the WBS) that are interfering with propagation.

If, on the other hand, the UE does have sufficient signal strength, then at 112, the WBS (or some other entity) can determine if there is sufficient capacity on the 5G network for additional traffic. As mentioned above, initially, the capacity of the 5G network may be somewhat limited simply because the components and software required have not been widely installed. In addition, if left to their own devices, users will tend to use the higher speed 5G network, regardless of whether it is actually necessary. To this end, the method 100 can determine whether sufficient capacity remains on the 5G network to maintain QoS and avoid congestion and/or other issues.

If the 5G network is at, or near, capacity, then at 106, the WBS can send a message (e.g., a SIP message) to the UE to cause the UE to connect to the 4G network. If there is sufficient capacity remaining on the 5G network, on the other hand, then at 114, the UE can be reallocated to the 5G network. As mentioned above, this reduces throughput and signaling requirements on the 4G network. In addition, because throughput on the 5G network can be 100 or more times higher than in the 4G network, downloading a file, for example, can require a fraction of the time on the 5G network than it does on the 4G network. Thus, overall network idle time and/or percentage is increased.

In some cases, the WBS can recheck with the UE periodically to ensure the conditions and/or services requested remain favorable for reallocation to the 5G network. As the UE moves from one cell to another, weather conditions change, or the UE moves closer to or farther from the WBS, the UE may need to be reverted to the 4G network. In addition, while the 5G network may be suitable for some services, the 4G network may be more suitable for other services. Thus, as a UE changes from downloading a file, for example, to placing a voice call, the method 100 may also revert to the 4G network. Indeed, the 5G network can simply provide another tool in the network resource management arsenal, with UEs switching back and forth between the 4G and 5G network as needed. As mentioned above, any reallocation from the 4G network to the 5G network frees up capacity on the 4G network and reduces overall network load due to the increased throughput provided by the 5G network.

Figure 2:
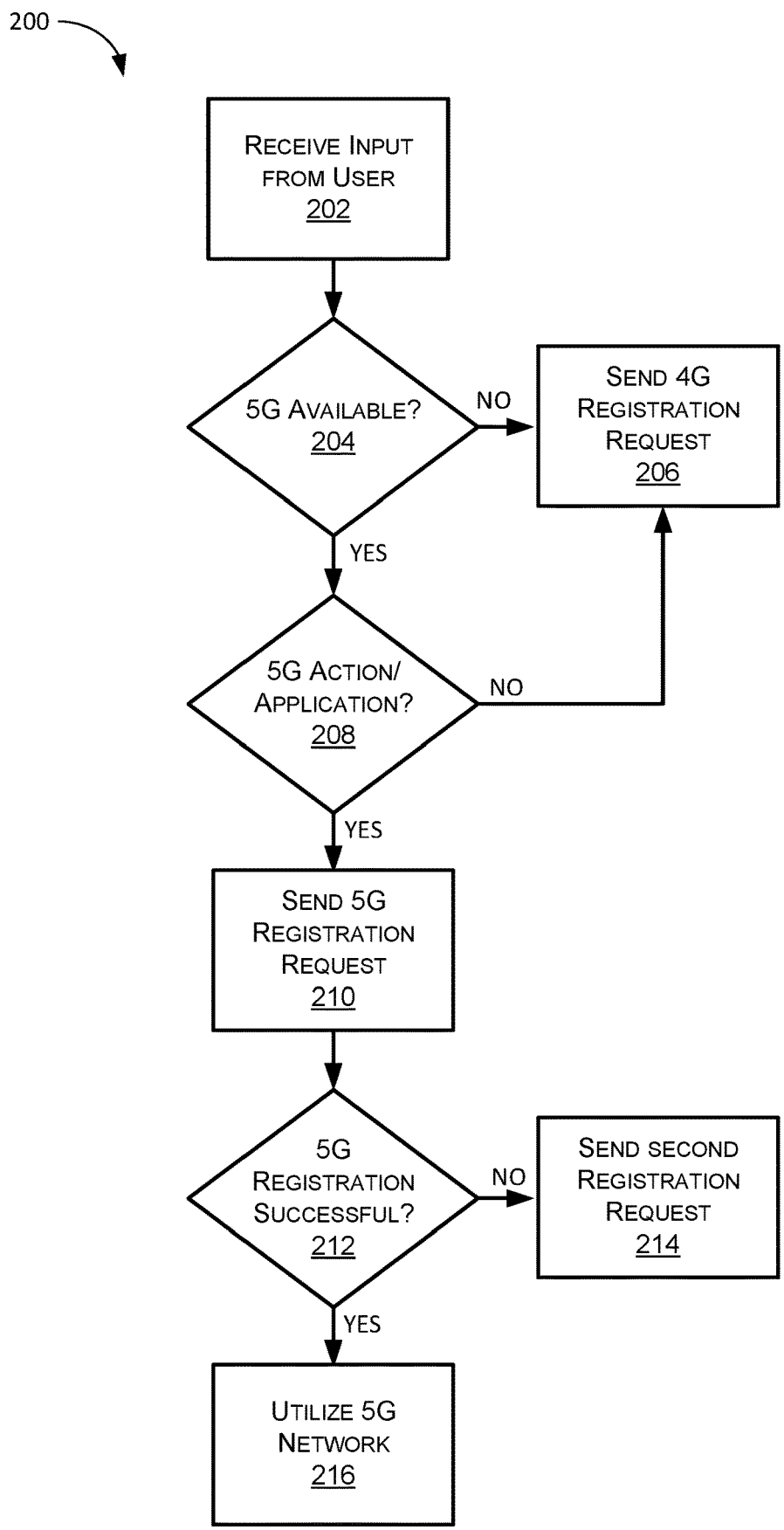
FIG. 2 is a flowchart depicting an example of a method for managing network traffic from a user equipment (UE) perspective, in accordance with some examples of the present disclosure.

As shown in FIG. 2, examples of the present disclosure can also include a method 200 for partially, or fully, managing network allocation from the UE. The UE can determine which network to request based on, for example, the application selected by the user, signal strength, battery and buffer levels, etc. And, while the UE may request to be connected to the 5G network, in certain circumstances, the network may nonetheless connect the UE to the 4G network for resource management reasons.

At 202, the UE can receive an input from the user. This may be the selection of an icon associated with an application or web browser, for example, or a send button for a voice call or text message. The UE can receive the input via a touchscreen, for example, or a mouse or keyboard, among other things. As discussed below, depending on the application, the UE can request either a 4G or a 5G connection. Applications that are better suited for connections with low latency or delay, for example, may be shifted to the 5G network, which inherently has lower latency. Applications associated with large downloads, for example, or otherwise high throughput applications, but are relatively time insensitive can also be reallocated to the 5G network.

At 204, the UE can determine if the UE is currently 5G capable and if there is 5G availability on the network. For the UE to be 5G capable, for example, the UE may preferably meet certain minimum conditions. In some examples, due to possible increased power and memory demands caused by the faster 5G network, the UE may need to have a predetermined battery charge (e.g., >25%) and a certain amount of buffer available (e.g., >100 MB). In other examples, the UE may need to have a minimum signal strength (e.g., at least approximately −90 dBm).

Of course, the UE also needs to be within range of a WBS that provides 5G connectivity and has available capacity. Thus, the UE may receive periodic updates from one or more WBSs in proximity to the UE indicating whether the WBS has 5G availability (e.g., the WBS has 5G capability and the network has 5G capacity available). As the 5G network becomes more widely available, 5G may become the default, with the WBSs providing the availability of the 4G network. If no 5G connectivity is available, then at 206, the UE can send a 4G registration request. The registration request can comprise a SIP message (e.g., a SIP REGISTER), or another suitable message, requesting to be connected to the WBS on the 4G network.

If the UE is 5G capable and the 5G network is available to the UE, then at 208, the UE can determine if the application or action requested by the user is an application that is suited for the 5G network. If the user presses the send button to connect a voice call, for example, this may remain on the 4G network. This is because the 4G network may provide better QoS and because voice calls require only minimum throughput. File transfer protocol (FTP) downloads of large files or OS updates, on the other hand, can be reallocated to the 5G network. These applications are relatively time insensitive, but can take advantage of the higher throughput speeds provided by the 5G network.

If the application is not suitable for the 5G network (e.g., a switching delay between the 4G and 5G networks causes QoS issues), then at 206, the UE can send a 4G registration request. The registration request can comprise a SIP message (e.g., SIP REGISTER) requesting to be connected to the WBS on the 4G network. If the application is 5G compatible, on the other hand, then at 210, the UE can send a 5G registration request. The registration request can comprise a SIP message requesting to be connected to the WBS on the 5G network. In some examples, the SIP message can include additional information (e.g., in the header) to indicate to which network the request is directed. In other examples, a separate SIP message for each network can be devised—e.g., REGISTER4G and REGISTER5G, or similar.

As mentioned above, in some examples, at least some of the decisions regarding reallocation can be made at the network level. Ultimately, the UE may request a 5G connection, therefore, but the 5G network may not be available. This may be because, for example, the WBS has no 5G capacity available (i.e., too many UE are already using 5G in the area), the WBS does not have 5G capability, or the WBS is having technical problems with the 5G related equipment.

To this end, at 212, the UE can determine if the 5G registration request was successful. If, for example, the UE receives a SIP 200 OK or an ACK from the WBS, then the UE can determine that the 5G registration was successful (e.g., the WBS has acknowledged the 5G registration request). If, on the other hand, the UE receives an error code (e.g., a 4XX, 5XX, or 6XX error code) from the WBS, then the UE can determine that the 5G registration was not successful.

If the 5G registration was not successful, then at 214, the UE can then send a second registration request. Depending on why the 5G registration request was unsuccessful, the UE may send a second 5G registration request or a 4G registration request. If the error code indicates a correctable problem or a temporary problem, for example, the UE can send a second 5G registration request. This can enable a server to come back online, for example, or a password to be corrected, among other things. If, on the other hand, the problem is longer term (or permanent) then the UE can send a 4G registration request. This may be because the WBS is not 5G capable, for example, is having equipment issues, etc. In this case, the UE can send, for example, a SIP REGISTER with and appropriate header requesting a 4G connection, for example, or a new, specific, SIP message—e.g., SIP REGISTER4G.

If the 5G registration was successful, then at 216, the UE can begin to utilize the 5G network. The UE can execute the command or application, for example, that was original selected by the user (e.g., a voice call, download, update, video stream, etc.). The UE may send a SIP SUBSCRIBE, for example, to subscribe to an appropriate application server (AS) or perform some other action to complete the requested command or application.

In some examples, the UE may repeat the method 200 each time an action is requested. In other examples, the UE can repeat the method 200 only when a new action is requested. In other words, if the user requests two file downloads in a row, then the UE can merely stay connected to the 5G network. If the user downloads a file and then initiates a video chat session, on the other hand, the UE may revert from the 5G network to the 4G network.

In some examples, using the same calculus as above, the UE may determine that it is advantageous to use both networks. In other words, based on conditions, the UE may determine that it is advantageous to use 4G for uplink and 5G for downlink, or vice-versa. In this case, the method can be significantly the same, but with the UE requesting and confirming each network separately. In this configuration, the UE may use two separate transceivers or a single, multi-channel transceiver to enable communication on both 4G and 5G frequencies contemporaneously.

In reality, the two methods 100, 200 can be combined to provide effective network resource management. Obviously, a network entity may be in a better position to determine network capacity on the 4G and 5G networks. The UE, on the other hand, may have more accurate information about signal strength and application selection, among other things. Thus, a combination of controls can enable the network to maintain network performance and the UE to maintain QoS for the user.

Figure 3:
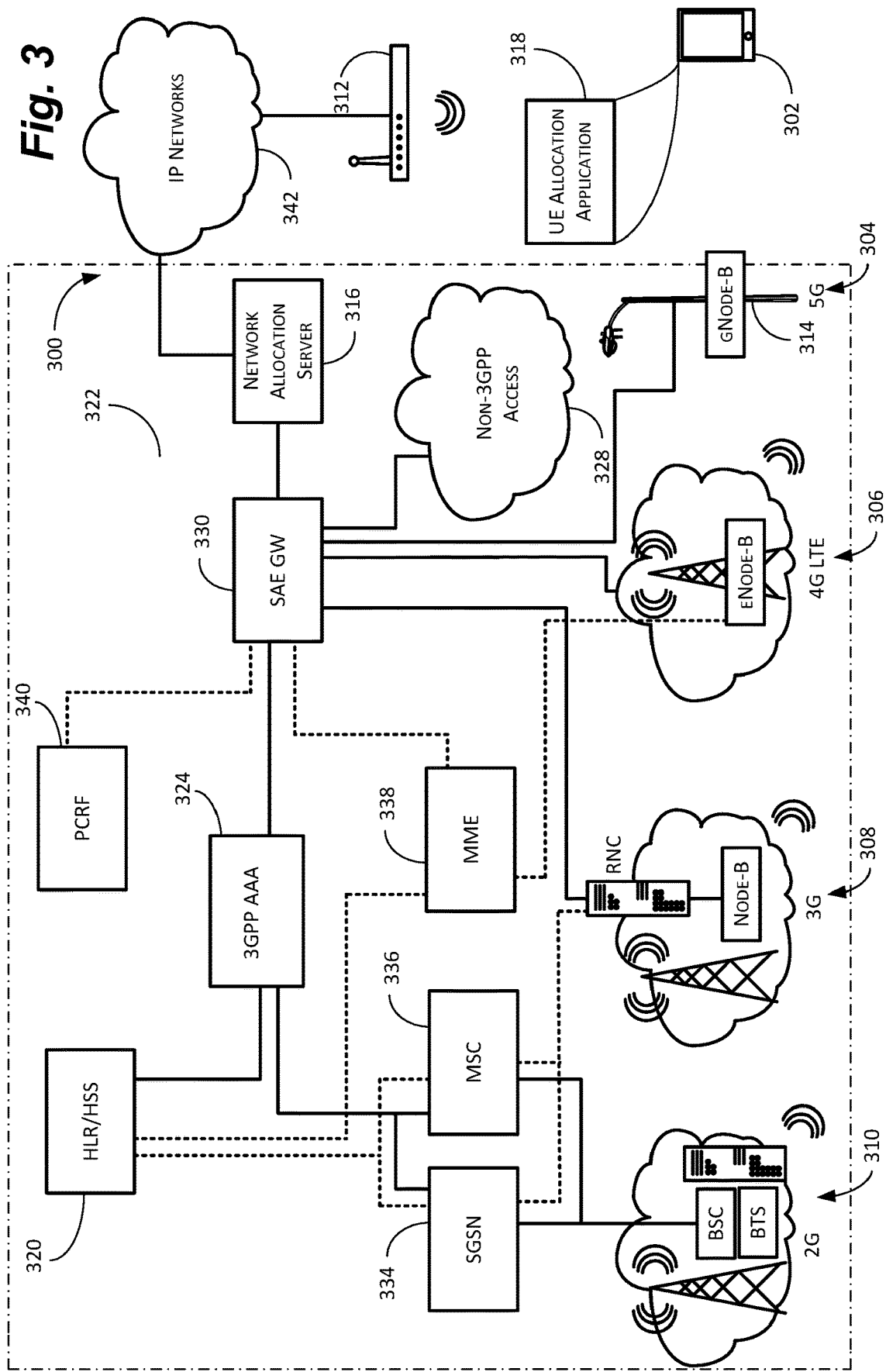
FIG. 3 is an example of a communications network for use with the system, in accordance with some examples of the present disclosure.

FIG. 3 is an example of a system 300 for reallocating traffic from the 4G network to the 5G network. The system 300 can include a plurality of UEs (though only one UE 302 is shown). The system can also include 5G 304, 4G 306, 3G 308, and 2G 310 cellular connections as well as a WLAN 312 connection. As mentioned above, the 5G 304 components may be located on a traditional cell tower. In some cases, 5G microcells can be included in updated streetlights 314, for example, to provide additional coverage. This may be useful for those portions of the spectrum that have more limited propagation and penetration. In other words, while some portions of the spectrum allocated to 5G use (e.g., 600 MHz) have relatively good penetration and propagation, penetration and propagation for other frequencies (e.g., mm-wave frequencies) are somewhat more limited.

As also mentioned above, the system 300 can be managed from the network, from the UE, or a combination thereof. To this end, the system can include a network allocation server 316. As the name implies, the network allocation server 316 can handle the allocation of resources from the network side using, for example, the method 100, discussed with reference to FIG. 1. The network allocation server 316 can be standalone, as shown, or can be included in one or more existing network entities (e.g., the home location register/home subscriber server (HLR/HSS) 320, discussed below).

In some examples, the system 300 can also include a UE allocation application 318. The UE allocation application 318 can be stored on, or accessible to, the UE 302. The UE allocation application 318 can manage network allocation from the UE perspective using, for example, the method 200 discussed above with reference to FIG. 2. The UE allocation application 318 can be stored on the UE 302 or can be stored on a remote server, cloud server, or other facility accessible to the UE 302 via one or more of the networks 304, 306, 308, 310, 312.

FIG. 3 depicts a cellular network 322 including 2G 310, 3G 308, and 4G long-term evolution (LTE) 306, and 5G 304 components. Of course, future technologies, such as, for example, internet of things (IoT) and device-to-device (D2D) components could also be included and are contemplated herein. As mentioned above, in some examples, the network allocation server 316 can be standalone. In other examples, many of the "back-end" components of the network 322 can handle some, or all, of the reallocation. Indeed, some, or all, of the aforementioned UE allocation application 318 and network allocation server 316 could be located on one or more of, for example, the HLR/HSS 320, a 3GPP AAA server 324, or other components. In other words, some, or all, of the UE allocation application 318 and network allocation server 316 can be installed on the UE 302, standalone, or can be integrated into one of the existing network components.

As is known in the art, data can be routed from the Internet or other sources using a circuit switched modem connection (or non-3GPP connection) 328, which provides relatively low data rates, or via IP based packet switched connections, which results is higher bandwidth. The 4G 306 and 5G 304 networks, which are purely IP based, essentially "flatten" the architecture, with data going straight from the Internet to the service architecture evolution gateway (SAE GW) 330 to evolved Node B transceivers, enabling higher throughput. Many UEs 302 also have wireless local area network (WLAN) 312 capabilities, in some cases enabling even higher throughput.

The serving GPRS support node (SGSN) 334 is a main component of the general packet radio service (GPRS) network, which handles all packet switched data within the cellular network 322—e.g. the mobility management and authentication of the users. The mobile switching center (MSC) 336 essentially performs the same functions as the SGSN 334 for voice traffic. The MSC 336 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 336 sets up and releases the end-to-end connection, handles mobility and hand-over requirements during the call, and takes care of billing and real time pre-paid account monitoring.

Similarly, the mobility management entity (MME) 338 is the key control-node for the 4G network 306. It is responsible for idle mode UE 302 paging and tagging procedures including retransmissions. The MME 338 is involved in the bearer activation/deactivation process and is also responsible for choosing the SAE GW 330 for the UE 302 at the initial attach and at time of intra-LTE handover involving core network (CN) node relocation (i.e., switching from one cell site to the next when traveling). The MME 338 is responsible for authenticating the user (by interacting with the HLR/HSS 320 discussed below). The non-access stratum (NAS) signaling terminates at the MME 338 and it is also responsible for generation and allocation of temporary identities to UE 302. The MME 338 also checks the authorization of the UE 302 to camp on the service provider's home public land mobile network (HPLMN) or visiting public land mobile network (VPLMN) and enforces UE 302 roaming restrictions on the VPLMN. The MME 338 is the termination point in the network for ciphering/integrity protection for NAS signaling and handles the security key management. The MME 338 also provides the control plane function for mobility between 4G 306 and 2G 310/3G 308 access networks with the S3 interface terminating at the MME 338 from the SGSN 334. The MME 338 also terminates the Sla interface towards the home HLR/HSS 320 for roaming UEs.

The HLR/HSS 320 is a central database that contains user-related and subscription-related information. The functions of the HLR/HSS 320 include functionalities such as mobility management, call and session establishment support, user authentication and access authorization. The HSS, which is used for LTE and 5G connections, is based on the previous HLR and authentication center (AuC) from CGMA and GSM technologies, with each serving substantially the same functions for their respective networks.

The policy and charging rules function (PCRF) 340 is a software node that determines policy rules in the cellular network 322. The PCRF 340 generally operates at the network core and accesses subscriber databases (e.g., the HLR/HSS 320) and other specialized functions, such as content handling (e.g., whether the user has sufficient data left in their plan), in a centralized manner. The PCRF 340 is the main part of the cellular network 322 that aggregates information to and from the cellular network 322 and other sources (e.g., IP networks 342). The PCRF 340 can support the creation of rules and then can automatically make policy decisions for each subscriber active on the cellular network 322. The PCRF 340 can also be integrated with different platforms like billing, rating, charging, and subscriber databases or can also be deployed as a standalone entity.

Finally, the 3GPP AAA server 324 performs authentication, authorization, and accounting (AAA) functions and may also act as an AAA proxy server. For WLAN 312 access to (3GPP) IP networks 342 the 3GPP AAA server 324 provides authorization, policy enforcement, and routing information to various WLAN components. The 3GPP AAA server 324 can generate and report billing/accounting information, perform offline billing control for the WLAN 312, and perform various protocol conversions when necessary.

In some examples, the HLR/HSS 320 and/or 3GPP AAA server 324 can contain some, or all, of the components of the system 300. In some examples, the HLR/HSS 320 and/or 3GPP AAA server 324 can include, for example, the network allocation server 316, UE allocation application 318, and other functions. Of course, as mentioned above, other components (e.g., the PCRF 340 or MME 338) could also include some, or all, of the system 300.

Figure 4:
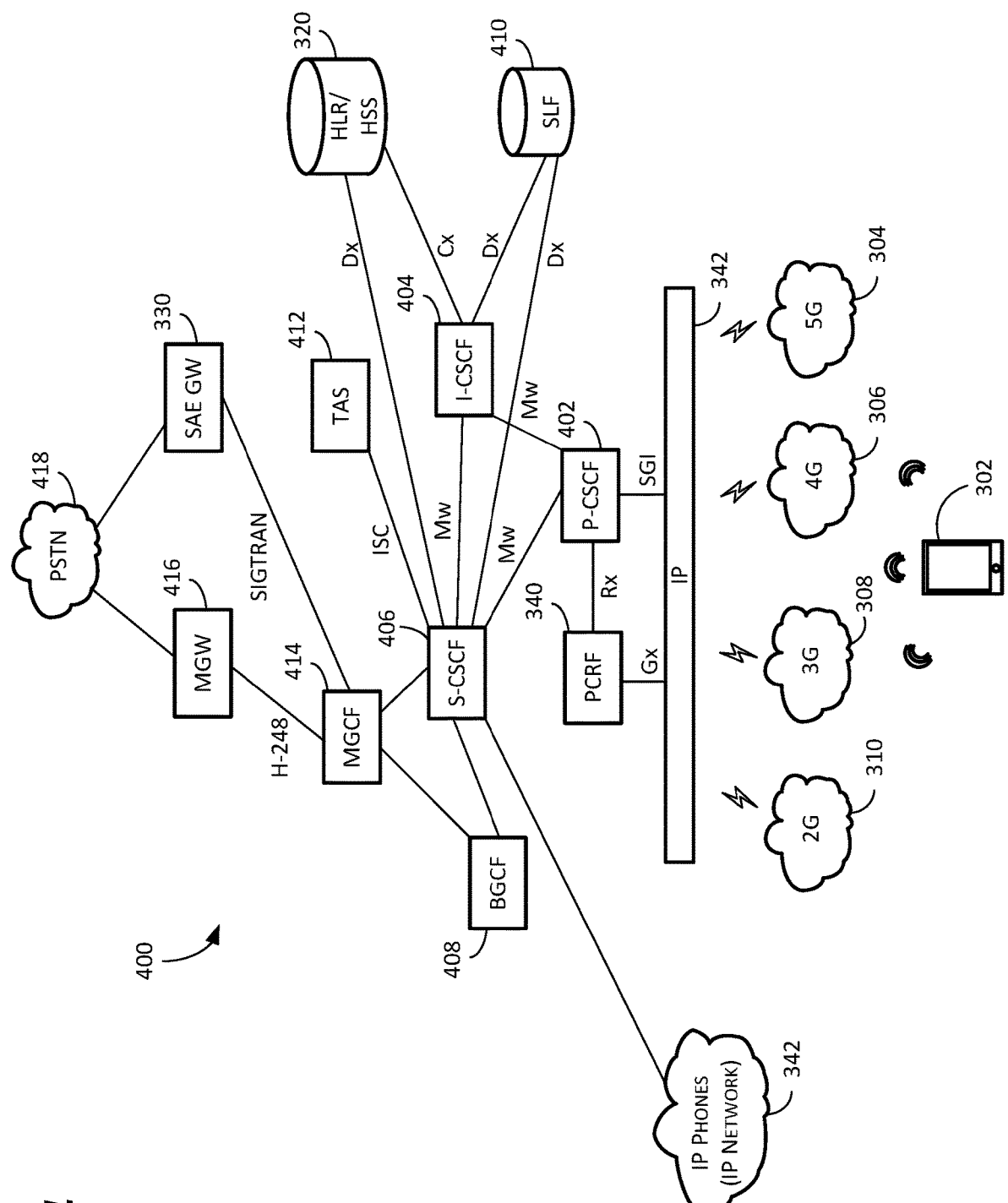
FIG. 4 is an example of an internet protocol multimedia subsystem (IMS) portion of the communications network for use with the system, in accordance with some examples of the present disclosure.

FIG. 4 includes a more detailed view of the components of the internet protocol multimedia subsystem (IMS) 400 for the 4G 306 and 5G 304 networks. As shown, the IMS 400 includes several network components for routing signals, storing subscriber information, and connecting across various subsystems and network types. The IMS 400 is built on SIP as the base to further support packaging of voice, video, data, fixed, and mobile services on a single platform to end users. It enables communications across multiple types of networks, including cellular, satellite, broadband, cable, fiber, and fixed networks, and enables the creation of efficient interoperating networks.

The IMS 400 also provides interoperability for the UE 302 and other devices across multiple platforms including, for example, 2G 310, 3G 308, 4G 306, 5G 304, and IP 342 networks. The IMS 400 also includes some components already discussed more generally in FIG. 3. These include, for example, the PCRF 340, HLR/HSS 320, and SAE GW 330.

The IMS 400 also includes a proxy-call session control function (P-CSCF) 402. The P-CSCF 402 is the entry point to the IMS 400 and serves as the outbound proxy server for the UE 302. The UE 302 attaches to the P-CSCF 402 prior to performing IMS registrations and initiating SIP sessions. The P-CSCF 402 may be in the home domain of the IMS operator, or it may be in the visiting domain, where the UE 302 is currently roaming. For attachment to a given P-CSCF 402, the UE 302 performs P-CSCF 402 discovery procedures. Attachment to the P-CSCF 402 enables the UE 302 to initiate registrations and sessions with the IMS 400.

The IMS 400 also includes an interrogating-call session control function (I-CSCF) 404. The I-CSCF 404 acts as an inbound SIP proxy server in the IMS 400. During IMS registrations, the I-CSCF 404 queries the HLR/HSS 320 to select the appropriate S-CSCF 406 (discussed below) which can serve the UE 302. During IMS 400 sessions, the I-CSCF 404 acts as the entry point to terminating session requests. The I-CSCF 404 routes the incoming session requests to the S-CSCF 406 of the called party.

The IMS 400 also includes a serving-call session control function (S-CSCF) 406. The S-CSCF 406 acts as a registrar server, and in some cases, as a redirect server. The S-CSCF 406 facilitates the routing path for mobile-originated or mobile-terminated session requests. The S-CSCF 406 also interacts with various components for playing tones and announcements, among other things. The S-CSCF 406 can receive initial filter criteria (IFCs) from the HLR/HSS 320 and establish the appropriate sessions with telephony application servers (TASs) 412 according to the services included in the IFC.

The IMS 400 also includes a breakout gateway control function (BGCF) 408. The BGCF 408 is the IMS 400 element that selects the network in which PSTN 418 (discussed below) breakout is to occur. If the breakout is to occur in the same network as the BGCF 408, for example, then the BGCF 408 selects a media gateway control function (MGCF) 414 (also discussed below) that will be responsible for interworking with the PSTN 418. The MGCF 414 then receives the SIP signaling from the BGCF 408.

The IMS 400 also includes a subscriber location function (SLF) 410. The SLF 410 provides information about the HLR/HSS 320 that is associated with a particular user profile. It is generally implemented using a database. If the IMS 400 contains more than one HLR/HSS 320, I-CSCF 404 and S-CSCF 406 will communicate with SLF 410 to locate the appropriate HLR/HSS 320 based on the user profile.

The IMS 400 also includes the aforementioned TAS 412. As the name implies, the TAS 412, sometimes known in a telephony context only as an application server (AS), is a component used to provide telephony applications and additional multimedia functions. The TAS 412 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 4, multiple TASs 412 are generally used to provide multiple services. Based on the IFC provided to the S-CSCF 406, for example, the S-CSCF 406 can establish sessions with one or more TASs 412, one TAS 412 for each service in the IFC.

The IMS 400 also includes the MGCF 414. The MGCF 414 is a SIP endpoint that handles call control protocol conversion between SIP and ISDN user part (ISUP)/bearer-independent call control (BICC) and interfaces with the SAE GW 330 over stream control transmission protocol (SCTP). The MGCF 414 also controls the resources in a media gateway (MGW) 416 across an H.248 interface. The MGW 416 is a translation device or service that converts media streams between disparate telecommunications technologies such as POTS, SS7, next generation networks (2G 310, 3G 308, 4G 306, and 5G 304) or private branch exchange (PBX) systems.

Finally, the IMS 400 also includes a public switched telephone network (PSTN) 418. The PSTN 418 is the world's collection of interconnected voice-oriented public telephone networks, both commercial and government-owned. It's also referred to as the plain old telephone service (POTS). With respect to IP phones (on the IP network 342), for example, the PSTN 418 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 5:
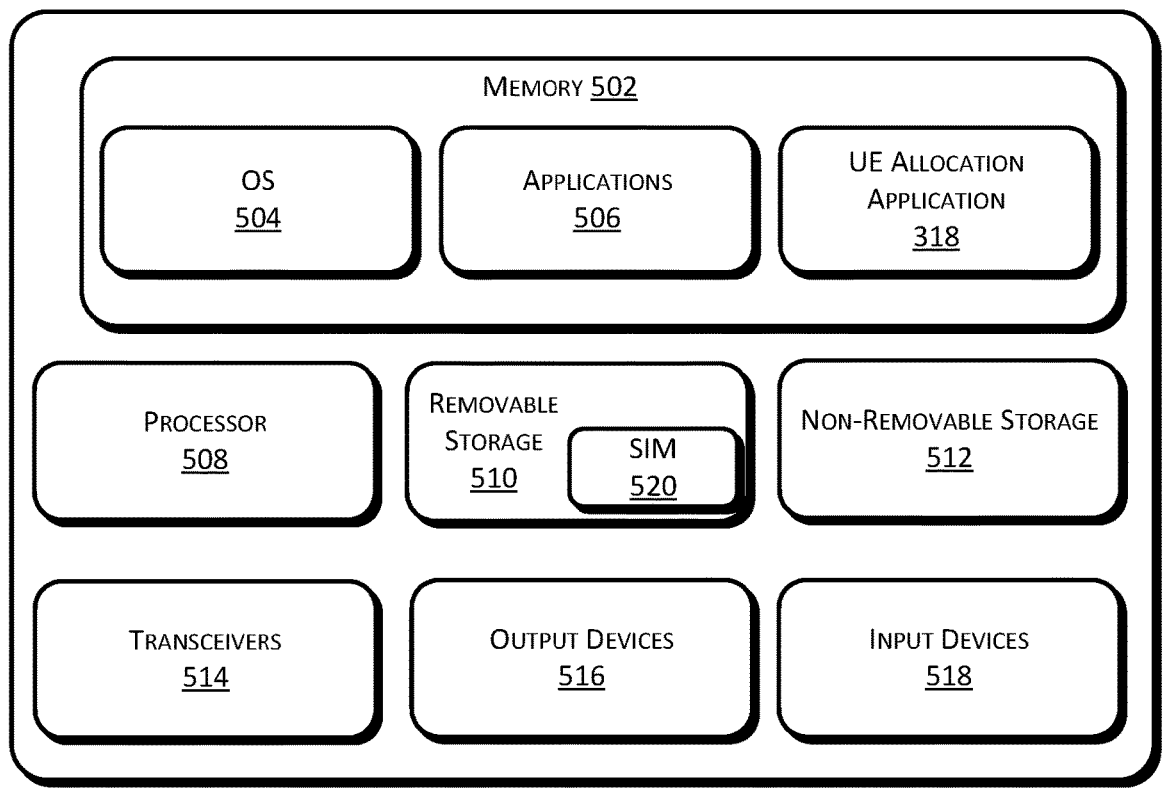
FIG. 5 is an example of a UE for use with the systems and methods disclosed herein, in accordance with some examples of the present disclosure.

FIG. 5 depicts a component level view of the UE 302 for use with the systems 300, 400 and methods 100, 200 described herein. For clarity, the UE 302 is described herein generally as a cell phone or smart phone. One of skill in the art will recognize, however, that the systems 300, 400 and methods 100, 200 described herein can also be used with a variety of other electronic devices, such as, for example, tablet computers, laptops, desktops, and other network (e.g., cellular or IP network) connected devices. These devices are referred to collectively herein as the UE 302.

The UE 302 can comprise a number of components to execute the above-mentioned functions. As discussed below, the UE 302 can comprise memory 502 including an OS 504 and common applications 506 such as, for example, contacts, calendar, call logs, voicemail, and e-mail, among other things. In some examples, the UE 302 can also comprise the UE allocation application 318. The UE 302 can also comprise one or more processors 508, one or more of removable storage 510, non-removable storage 512, transceiver(s) 514, output device(s) 516, and input device(s) 518. In some examples, such as for cellular communication devices, the UE 302 can also include a SIM 520 including an international mobile subscriber identity (IMSI), and other relevant information.

In various implementations, the memory 502 can be volatile (such as random access memory (RAM)), non-volatile (such as read only memory (ROM), flash memory, etc.), or some combination of the two. The memory 502 can include all, or part, of the functions 318, 506 and the OS 504 for the UE 302, among other things.

The memory 502 can also include the OS 504. Of course, the OS 504 varies depending on the manufacturer of the UE 302 and currently comprises, for example, iOS 11.2.6 for Apple products and Oreo for Android products. The OS 504 contains the modules and software that support a computer's basic functions, such as scheduling tasks, executing applications, and controlling peripherals. In some examples, the OS 504 can receive signals from the various components—e.g., the transceiver(s) 514 for signal strength measurements—on the UE 302 to enable the UE allocation application 318 to make various decisions, as discussed above. The OS 504 can also enable the UE 302 to send and retrieve data via an internet connection and perform other functions.

The UE 302 can also comprise one or more standard applications 506. The applications 506 can include those "factory" applications normally included with UEs. These can include, for example, e-mail applications for sending and receiving e-mail, contacts to store the user's contacts, calendar functions, web browsers, etc. The applications 506 can also include applications downloaded from the Internet, from an "app" store, or from other sources.

The UE 302 can also include the UE allocation application 318. The UE allocation application 318 can provide functions to enable the UE 302 to at least partially manage network allocation from the UE side, as discussed above with reference to FIG. 2. Thus, the UE allocation application 318 can receive inputs from users, for example, regarding which application is being used. The UE allocation application 318 can also receive inputs from the transceiver(s) 514 regarding signal strength, onboard batteries regarding battery levels, and from the memory 502 regarding buffer levels, among other things, to enable the UE allocation application 318 to determine whether the UE 302 is currently 5G capable. The UE allocation application 318 can then request a 4G connection or a 5G connection from the WBS, as appropriate, to connect to the cellular network 322 and perform the desired functions.

The UE 302 can also comprise one or more processors 508. In some implementations, the processor(s) 508 can be a central processing unit (CPU), a graphics processing unit (GPU), or both CPU and GPU, or any other sort of processing unit. The UE 302 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the functions 318, 506 and/or OS 504.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 302. Any such non-transitory computer-readable media may be part of the UE 302 or may be a separate database, databank, remote server, or cloud-based server.

In some implementations, the transceiver(s) 514 include any sort of transceivers known in the art. In some examples, the transceiver(s) 514 can include wireless modem(s) to facilitate wireless connectivity with the other UE, the Internet, and/or an intranet via the cellular network 322. Further, the transceiver(s) 514 may include a radio transceiver that performs the function of transmitting and receiving radio frequency communications via an antenna (e.g., Wi Fi or Bluetooth®). In other examples, the transceiver(s) 514 may include wired communication components, such as a wired modem or Ethernet port, for communicating with the other UE or the provider's internet-based network. In this case, the transceiver(s) 514 can also provide information related to signal strength and/or signal quality to enable the UE allocation application 318 to perform the functions discussed above. Thus, the transceiver(s) 514 may provide data related to signal strength such as, for example, received signal strength indicator (RSSI) or reference signal received power (RSRP). The transceiver(s) 514 may also provide data related to signal quality such as, for example, energy to interference ratio (Ec/Io) reference signal received quality (RSRQ), or signal to interference-plus-noise ratio (SINR). Of course, other metrics could also be used.

In some examples, as discussed above, the transceiver(s) 514 can be capable of 2G, 3G, 4G, 5G, and other cellular communications. In some examples, multiple transceivers 514 or multi-channel transceiver(s) can enable the UE 302 to communicate on multiple networks (e.g., 4G and 5G networks) either alternately or at the same time. In some examples, the transceiver(s) 514 can enable the UE 302 to communicate with a first network (e.g., 4G) for uplink and a second network (e.g., 5G) for downlink, or vice-versa.

In some implementations, the output device(s) 516 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 302 is placing or receiving a call or connecting to the cellular network 322 via the 4G network 306 or the 5G network 304. The output device(s) 516 can also play different sounds when receiving an incoming call or text message. The output device(s) 516 can also play sounds and/or display messages in response to the start of, or successful completion of, downloads. Output device(s) 516 also include ports for one or more peripheral devices, such as headphones, peripheral speakers, or a peripheral display.

In various implementations, input device(s) 518 include any sort of input devices known in the art. For example, the input device(s) 518 may include a camera, a microphone, a keyboard/keypad, or a touch-sensitive display. A keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. In some examples, the UE 302 can include a touchscreen, for example, to enable the user to make selections (e.g., from the applications 506) directly on the touchscreen; which, in turn, can enable the UE allocation application 318 to determine with which network (e.g., the 4G 306 or 5G 304 network) the UE 302 should (attempt to) connect. As mentioned above, some of the applications 506 may be more suited for the 4G network 306, while others may be more suitable for the 5G network 304.

In the case of cellular-connected UE, the UE 302 can also include a subscriber identity module (SIM) 520. The SIM 520 can include various information about the user's account including, for example, an international mobile subscriber identity (IMSI). The IMSI, in turn, can include various information related to the country (mobile country code, or MCC) network provider (mobile network code, or MNC), and the mobile station international subscriber directory number (MSISDN). This information can be used by the cellular network 322 to determine whether the UE 302 is a home UE or a roaming UE and associate the UE 302 with a user's account. In this case, the SIM 520 can also include information about whether the UE 302 is capable of connecting to the 5G network 304, among other things. And, while shown as removable storage in FIG. 5, the SIM 520 can also include an integrated component such as, for example, an embedded SIM (e-SIM).

Figure 6:
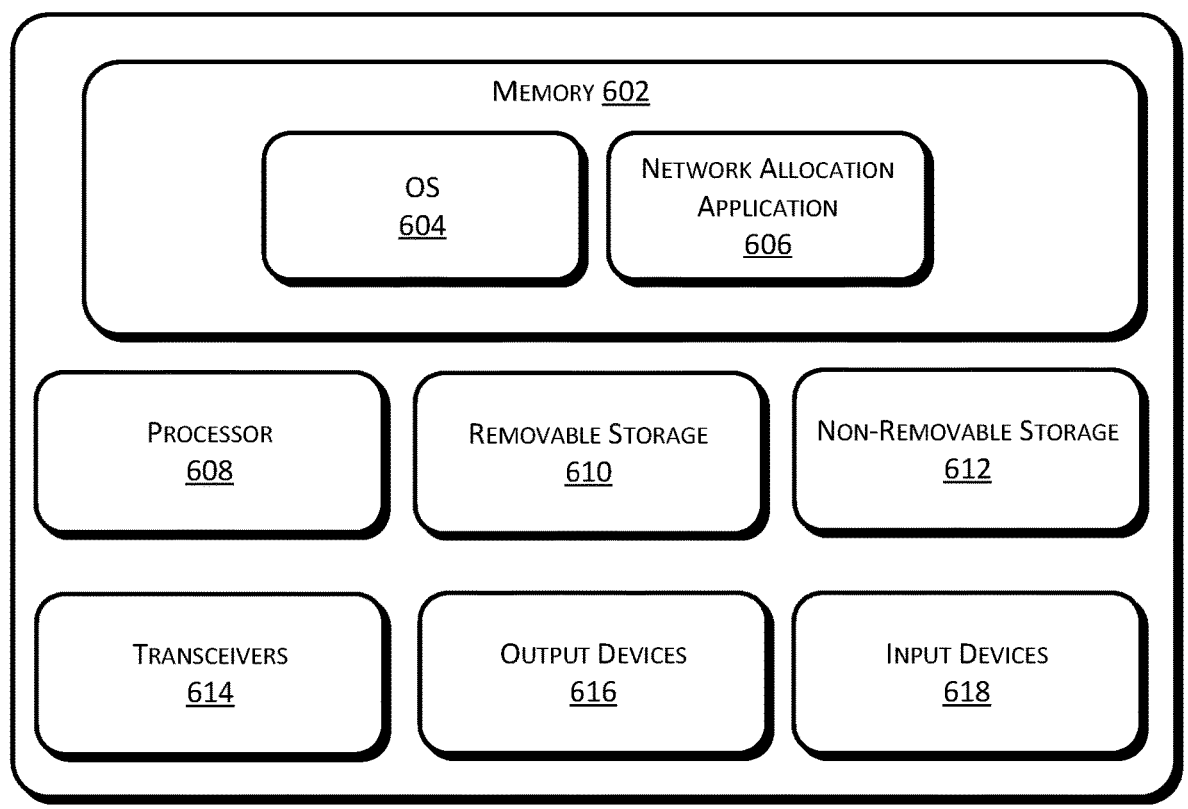
FIG. 6 is an example of a network allocation server for use with the systems and methods disclosed herein, in accordance with some examples of the present disclosure.

As shown in FIG. 6, the systems 300, 400 and methods 100, 200 can also be used in conjunction with a network entity 600 such as, for example, the network allocation server 316 or the WBS. For clarity, the network allocation server 316 is described herein as a standalone server. One of skill in the art will nonetheless recognize that the various components of the systems 300, 400 and methods 100, 200 described herein could be located in various other components of the cellular network. Thus, the network allocation server 316 is intended only to simplify the discussion and not to limit the disclosure. The network allocation server 316 can also be included as part of an existing network entity such as for example, the WBS, the 3GPP AAA server 324, the P-CSCF 402, or the PCRF 340.

The network entity 600 can comprise a number of components to execute the above-mentioned functions and methods 100, 200. As discussed below, the network entity 600 can comprise memory 602 including, for example, an OS 604 and a network allocation application 606, among other things. In various implementations, the memory 602 can be volatile (such as RAM), non-volatile (such as ROM, flash memory, etc.), or some combination of the two. The memory 602 can also include the OS 604. Of course, the OS 604 varies depending on the manufacturer of the network entity 600 and the type of component. Many servers, for example, run Linux or Windows Server. Dedicated cellular routing servers may run specific telecommunications OSs. The OS 604 contains the modules and software that supports a computer's basic functions, such as scheduling tasks, executing applications, and controlling peripherals.

In this case, the network entity 600 can also include the network allocation application 606. As discussed above with reference to FIG. 1, the network allocation application 606 can enable the network entity 600 to perform the method 100 for controlling network allocation from the network side. Thus, the network entity 600 can receive registration requests from the UE 302, monitor traffic on the 4G 306 and 5G 304 networks, and make allocation decisions to optimize flow on both networks 304, 306. Thus, the network entity 600 may monitor traffic via the SAE GW 330 and other network entities to facilitate this flow optimization.

The network entity 600 can also comprise one or more processors 608. In some implementations, the processor(s) 608 can be a central processing unit (CPU), a graphics processing unit (GPU), or both CPU and GPU, or any other sort of processing unit. The network entity 600 can also include one or more of removable storage 610, non-removable storage 612, transceiver(s) 614, output device(s) 616, and input device(s) 618.

The network entity 600 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store some, or all, of the OS 604 and the network allocation application 606.

Non-transitory computer-readable media may include volatile and nonvolatile, removable and non-removable tangible, physical media implemented in technology for storage of information, such as computer readable instructions, data structures, program modules, or other data. The memory 602, removable storage 610, and non-removable storage 612 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the network entity 600. Any such non-transitory computer-readable media may be part of the network entity 600 or may be a separate database, databank, remote server, or cloud-based server.

In some implementations, the transceiver(s) 614 include any sort of transceivers known in the art. In some examples, the transceiver(s) 614 can include wireless modem(s) to facilitate wireless connectivity with the UE, the Internet, the cellular network 322, and/or an intranet via a cellular connection. Further, the transceiver(s) 614 may include a radio transceiver that performs the function of transmitting and receiving radio frequency communications via an antenna (e.g., Wi-Fi or Bluetooth®) to connect to the IP network 342. In other examples, the transceiver(s) 614 may include wired communication components, such as a wired modem or Ethernet port, for communicating with the UE 302, the SAE GW 330, or other entities in the cellular network 322 or IP network 342.

In some examples, as discussed above, the transceiver(s) 614 for the network entity 600 (e.g., the WBS) can be capable of 2G, 3G, 4G, 5G, and other cellular communications. In some examples, multiple transceivers 614 or multi-channel transceiver(s) can enable the network entity 600 to communicate on multiple networks (e.g., 4G and 5G networks) either alternately or at the same time. In some examples, the transceiver(s) 6014 can enable the network entity 600 to communicate with the UE 302 on a first network (e.g., 4G) for uplink and a second network (e.g., 5G) for downlink, or vice-versa.

In some implementations, the output device(s) 616 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the network entity 600 connects a UE 302 to the 4G 306 or 5G 304 networks. Output device(s) 616 also include ports for one or more peripheral devices, such as headphones, peripheral speakers, or a peripheral display.

In various implementations, input device(s) 618 include any sort of input devices known in the art. For example, the input device(s) 618 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular and IP communications, the systems and methods can be used with other types of wired and wireless communications. In addition, while various functions are discussed as being performed on the network allocation server 316 and/or by the UE 302, other components could perform the same or similar functions without departing from the spirit of the invention. In addition, while the disclosure is primarily directed to allocating resources between the current 4G network and coming 5G network, the system could obviously be used in a similar manner on other networks, including future networks.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for allocating network resources with a network entity comprising:
    receiving, with at least one transceiver of a wireless base station (WBS), a session initiation protocol (SIP) registration request from a user equipment (UE), the SIP registration request comprising a service request, UE capability data indicating one or more UE capabilities associated with operating on a second network, and a request to connect to the second network;
    determining, with a processor of the WBS and based on the UE capability data, that the UE is capable of using a first network and the second network;
    determining, with the processor of the WBS, that there is sufficient capacity on the second network;
    establishing, with the at least one transceiver of the WBS, a first connection with the UE on the second network;
    determining, with the processor of the WBS, that a strength of a signal transmitted between the at least one transceiver and the UE is below a predetermined level; and
    based on determining that the strength of the signal is below the predetermined level, establishing, with the at least one transceiver of the WBS, a second connection with the UE on the first network.

2. The method of claim 1, wherein the service request comprises a request to connect to a first application, the method further comprising:
    determining, with the processor of the WBS, that the first application is suitable for use on the second network.

3. The method of claim 1, wherein the first network comprises a 4G network; and
    wherein the second network comprises a 5G network.

4. The method of claim 1, the predetermined level being a first predetermined level, the method further comprising:
    determining, with the processor of the WBS, a traffic level on the first network; and
    determining, with the processor of the WBS, that the traffic level on the first network is greater than or equal to a second predetermined level, wherein establishing the second connection is further in response to determining that the traffic level on the first network is greater than or equal to the second predetermined level.

5. The method of claim 1, the SIP registration request being a first registration request, the service request being a first service request, the method further comprising:
receiving, with the at least one transceiver of the WBS, a second SIP registration request from the UE, the second SIP registration request including a second service request that is different than the first service request, the second service request being associated with an application that is unsuitable for use on the second network;
establishing, with the at least one transceiver of the WBS, a third connection with the UE on the first network; and
transmitting or receiving, with the transceiver of the WBS, data associated with the application over the third connection.

6. A method performed by a wireless base station (WBS) comprising at least one transceiver, the method comprising:
receiving a first session initiation protocol (SIP) registration request from a user equipment (UE), the first SIP registration request comprising first UE capability data indicating a first UE capability associated with operating on a second network and a request to connect to the second network;
determining, based on the first UE capability data, that the UE is capable of using a first network and the second network;
identifying a signal strength of the UE;
determining that the signal strength of the UE is insufficient to use the second network;
based on determining that the signal strength of the UE is insufficient, transmitting, by the at least one transceiver, an error message;
receiving, by the at least one transceiver, a second SIP registration request from the UE, the second SIP registration request comprising second UE capability data indicating a second UE capability associated with operating on the first network and a request to connect to the first network;
based on the second SIP registration request, establishing, by the at least one transceiver, a first connection with the UE over a first network;
determining that the signal strength has become sufficient to use the second network; and
based on determining that the signal strength has become sufficient, establishing, by the at least one transceiver, a second connection with the UE over the second network.

7. The method of claim 6, wherein the first network is a 4G network, and
wherein the second network is a 5G network.

8. The method of claim 6, wherein the first network utilizes a first frequency spectrum that comprises first frequencies, and
wherein the second network utilizes a second frequency spectrum that comprises second frequencies, the second frequencies being higher than the first frequencies.

9. The method of claim 6, wherein the signal strength comprises a strength of a signal transmitted between the at least one transceiver of the WBS and the UE.

10. The method of claim 6, further comprising:
determining that there is sufficient capacity on the second network to accommodate additional traffic.

11. The method of claim 6, further comprising:
determining a traffic level on the first network; and
determining that the traffic level on the first network is less than or equal to a predetermined level,
wherein the first connection is established in response to determining that the traffic level on the first network is less than or equal to the predetermined level.

12. The method of claim 6, wherein establishing the first connection comprises transmitting, to the UE by the at least one transceiver of the WBS, a registration acknowledgement associated with the first network.

13. The method of claim 6, wherein determining the signal strength of the UE comprises determining that the signal strength has risen above a predetermined level.

14. A wireless base station (WBS) comprising:
at least one transceiver configured to receive, from a user equipment (UE), a session initiation protocol (SIP) registration request comprising UE capability data indicating one or more UE capabilities associated with operating on a 5G network and a request to connect to the 5G network;
one or more processors; and
memory storing instructions that, when executed by the one or more processors, cause the WBS to perform operations comprising:
identifying a strength of a signal transmitted between the WBS and the UE;
determining that a signal strength is greater than or equal to a first level;
based on the UE capability data and determining that the signal strength is greater than or equal to the first level, establishing, by the at least one transceiver, a first connection with the UE over the 5G network;
determining that the signal strength has fallen below the first level;
identifying that the UE is at least temporarily 5G-incapable;
based on determining that the signal strength has fallen below the first level and identifying that the UE is at least temporarily 5G-incapable:
establishing, by the at least one transceiver, a second connection with the UE over a 4G network; and
ending the first connection with the UE over the 5G network.

15. The system of claim 14, wherein the operations further comprise:
determining that the UE is 4G-capable and 5G-capable, and
wherein identifying that the UE is at least temporarily 5G-incapable comprises determining that a battery level of the UE or a memory buffer level of the UE has fallen below a second level.

16. The system of claim 14, wherein the operations further comprise:
determining that the 5G network has sufficient capacity, and
wherein establishing the first connection is in response to determining that the 5G network has the sufficient capacity.

17. The method of claim 1, further comprising:
transmitting, with the at least one transceiver of the WBS, data to the UE over the second connection; or
receiving, with the at least one transceiver of the WBS, data from the UE over the second connection.

18. The method of claim 1, further comprising:
based on determining that the strength of the signal is below the predetermined level, ending the first connection.

19. The method of claim 6, further comprising:
transmitting, by the at least one transceiver, data to the UE over the second connection; or receiving, by the at least one transceiver, data from the UE over the second connection.

20. The system of claim 14, wherein the operations further comprise:
   determining that the UE is 4G-capable and 5G-capable, and
   wherein identifying that the UE is at least temporarily 5G-incapable comprises determining that a memory buffer level of the UE has fallen below a second level.

* * * * *